United States Patent
Morishita et al.

(10) Patent No.: US 6,519,039 B1
(45) Date of Patent: Feb. 11, 2003

(54) GAS SPECTROCHEMICAL ANALYZER, AND SPECTROCHEMICAL ANALYZING METHOD

(75) Inventors: Jun-ichi Morishita, Tokyo (JP); Yoshio Ishihara, Tokyo (JP); Shang-Qian Wu, Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/423,605

(22) PCT Filed: Mar. 5, 1999

(86) PCT No.: PCT/JP99/01061

§ 371 (c)(1), (2), (4) Date: Nov. 12, 1999

(87) PCT Pub. No.: WO99/46580

PCT Pub. Date: Sep. 16, 1999

(30) Foreign Application Priority Data

Mar. 11, 1998 (JP) .......... 10-060130

(51) Int. Cl.$^7$ .......... G01N 21/61
(52) U.S. Cl. .......... 356/437
(58) Field of Search .......... 356/437, 438, 356/439

(56) References Cited

U.S. PATENT DOCUMENTS

| | | | | |
|---|---|---|---|---|
| 5,301,014 A | * | 4/1994 | Koch | 356/437 |
| 5,572,031 A | * | 11/1996 | Cooper et al. | 356/437 |
| 5,636,035 A | * | 6/1997 | Whittaker et al. | 356/437 |
| 5,703,365 A | | 12/1997 | Ishihara et al. | |

FOREIGN PATENT DOCUMENTS

| | | |
|---|---|---|
| EP | 0 706 042 | 4/1996 |
| JP | 1-285841 | 11/1989 |
| JP | 5-256768 | 10/1993 |
| JP | 5-256769 | 10/1993 |
| JP | 5-296922 | 11/1993 |
| JP | 6-148072 | 5/1994 |
| JP | 6-174638 | 6/1994 |
| JP | 7-151681 | 6/1995 |
| JP | 9-222394 | 8/1997 |
| WO | WO 95/26497 | 10/1995 |

* cited by examiner

Primary Examiner—Richard A. Rosenberger
(74) Attorney, Agent, or Firm—Oblon, Spivak, McClelland, Maier & Neustadt, P.C.

(57) ABSTRACT

A gas spectroscopic analysis device for analyzing a trace impurity in a sample gas by obtaining the second derivative spectrum of the light absorption intensity by passing frequency modulated diode laser light through a low-pressure sample gas is provided with a modulation amplitude calculating device (1) for controlling the modulation amplitude of the laser light in accordance with the characteristics of diode laser (11); a spectrum calculating device (2) for calculating the peak absorption intensity and the wavelength interval between the minimum values on the left and right hand of the peak in the second derivative spectrum obtained by measurement; and a pressure adjusting device (3) for controlling the pressure inside measuring gas-cell (14) so that the value of the absorption intensity obtained at spectrum calculating device (2) becomes maximal. The optimal value of the modulation amplitude of the laser light is set so that the wavelength interval between the minimum values on the left and right hand of the peak in the second derivative spectrum is 0.0116 nm. The measurement pressure is optimized by setting the modulation amplitude to an optimal value.

8 Claims, 13 Drawing Sheets

GAS SPECTROCHEMICAL ANALYZER, AND SPECTROCHEMICAL ANALYZING METHOD

TECHNICAL FIELD

The present invention relates to a method and device for analyzing trace components present in a gas with high sensitivity and high accuracy by means of spectroscopic analysis using a diode laser as the light source. More particularly, the present invention is designed to facilitate optimization of the conditions for measurement.

BACKGROUND ART

A spectroscopic analysis method in which the degree of light absorption by a gas is measured using a diode laser as the light source is widely used as a method for analyzing trace impurities in gas, since it offers good measurement accuracy and sensitivity.

FIG. 10 is a schematic structural diagram showing an example of a conventional gas spectroscopic analysis device. In this device, the laser light oscillated from diode laser 11, the light source, is collimated at collimating lens system 12, and then split into three lines, i.e., first through third lines, by two beam splitters 13,13. The laser light in the first line is projected on measuring gas-cell 14. The intensity of the outgoing transmitted light which has passed through measuring gas-cell 14 is then detected at first light detector 15. The laser light in the second line is projected on reference gas-cell 16. The intensity of the outgoing transmitted light which has passed through reference gas-cell 16 is then detected at second light detector 17. The intensity of the laser light in the third line is detected at third light detector 18.

A sample gas supply system 23 is provided to measuring gas-cell 14, by means of which the sample gas is introduced into cell 14 at a suitable reduced pressure and constant flow rate. The impurities to be measured that are included in the sample gas are supplied to reference gas-cell 16, and the absorption peaks due to these impurities are detected.

An InGaAsP, InGaAs, GaInAsSb, GaInSbP, AlInSb, AlInAs, AlGaSb or the like may be suitably employed for diode laser 11. Diode laser 11 is not limited to these however. In addition, a tunable diode laser which can oscillate laser light of a wavelength suitable for analysis may be used.

A device having a sensitivity to the oscillation wavelength band of diode laser 11, the light source, is employed for the first through third light detectors 15, 17, 18. A light sensor such as a Ge photo diode may be employed, for example. The respective outputs from these first through third light detectors 15, 17, 18 undergo signal processing at first through third lock-in amplifiers 19,20,21, are relayed to computer 22, and then subject to data processing as necessary.

A temperature controller 24 for controlling the temperature of the laser element, an LD driver 25 for supplying current to and driving laser 11, and a function generator 26 for serving as a frequency modulating device for modulating the oscillation frequency of laser 11 based on a frequency modulation method, are provided to diode laser 11. Temperature controller 24, LD driver 25, and function generator 26 are connected to computer 22. By adjusting the temperature of the laser element using temperature controller 24, the oscillation wavelength of laser 11 is changed to approach the central wavelength of the absorption peak for the impurities being measured, after which the temperature of the laser element is maintained at a constant value. In addition, by continuously changing the injection current (direct current component) to laser 11, the oscillation wavelength of laser 11 is continuously changed. In addition, by introducing a modulation signal (alternating current component) to LD driver 25 that is based on the frequency modulating method from function generator 26, and superimposing this modulation signal (alternating current component) on the injection current (direct current component) to laser 11, frequency modulation can be applied directly to the laser light oscillated from laser 11.

The phrase "oscillation wavelength of laser 11" as used in this specification means the wavelength which is not in a frequency modulated state, i.e., the central wavelength.

In this example, frequency modulation is applied to the laser light, and only the twice component of the modulated frequency is extracted using first through third lock-in amplifiers 19, 20, and 21. Specific data processing is then performed by computer 22 to obtain the second derivative spectrum. It is known that good measurement sensitivity can be obtained by this method (Japanese Patent Application, First Publication No. Hei 5-99845). In addition, it is known that the peak intensity of the second derivative spectrum that is obtained can be increased by placing the sample gas in a reduced pressure state (International Publication Number WO 95/26497).

In the aforementioned frequency modulating method, the current i introduced into the diode laser can be expressed as $$i = I_0 + a \cdot \sin(\omega t)$$

Here, $I_0$ is the direct current component, $a \cdot \sin(\omega t)$ is the alternating current component (modulation signal). $\alpha$ is the modulation amplitude (amplitude of the modulation signal), and $\omega$ is the modulation angular frequency. As a result of this type of frequency modulation, the frequency (wavelength) of the laser light varies cyclically at a fixed amplitude around the central frequency (central wavelength) when there is no modulation. The amplitude by which the frequency (wavelength) of the laser light varies becomes greater as modulation amplitude $\alpha$ becomes bigger. The cycle by which the frequency (wavelength) varies is determined based on the frequency of the modulation signal (modulation frequency).

If the modulation amplitude of the laser light is made large in the measurement, then the spectrum width becomes bigger. However, the variation in output power also becomes greater, so that there is an increase in noise as a result.

FIG. 11 shows an example of the second derivative spectrum obtained using a gas spectroscopic analysis method employing this type of device. In this figure, the oscillation wavelength is shown on the horizontal axis, while the second derivative value (optional units) of the light absorption intensity is shown on the vertical axis. The average of the respective differences between peak value P in the second derivative spectrum and minimum values A and B on the left and right hand of peak value P, i.e., differences $I_{SL}$ and $I_{SR}$ ($I_{SL}=$P$-$A, $I_{SR}=$P$-$B), is the absorption intensity (absorption intensity $=(I_{SL}+I_{SR})/2$). The ratio of the absorption intensity and the standard deviation of the background noise (indicated by n in the figure) is the S/N ratio. The symbol W in the figure indicates the wavelength interval between the minimum values on the left and right hand of the peak.

The modulation amplitude of the laser light and the measurement pressure effect the S/N ratio in this type of spectroscopic analysis method. Accordingly, it is necessary to optimize these conditions in order to perform highly sensitive measurements. In order to optimize the modulation amplitude and measurement pressure, it has been the practice to employ a method in which a highly pure base gas and a sample gas containing a trace component which is to be measured in the base gas are each measured while gradually varying the measurement pressure and the modulation amplitude, and the modulation amplitude and measurement pressure at which the S/N ratio is maximal are obtained. The optimization of the modulation amplitude and the measurement pressure must be carried out each time there is a change in the sample gas. Accordingly, this requires much effort and time, and has been a cause of increased cost.

The present invention was conceived in view of the above-described circumstances, and is intended to facilitate the optimization of measurement conditions in a method for analyzing trace impurities in a sample gas by obtaining the second derivative spectrum of the light absorption intensity by passing frequency modulated diode laser light through a reduced pressure gas which is the target of measurement.

DISCLOSURE OF INVENTION

In order to resolve the above-stated problems, the present invention's gas spectroscopic-analysis device is provided with a tunable diode laser; a frequency modulating device for performing frequency modulation of the diode laser; a device for passing laser light oscillated by the diode laser through the sample gas; a device for measuring the intensity of the laser light which has passed through the sample gas; and a device for obtaining the second derivative spectrum from the measured laser light intensity; wherein this gas spectroscopic analysis device is provided with a modulation amplitude calculating device for calculating the optimal value of the modulation amplitude from the diode laser characteristics and controlling the frequency modulating device so that the modulation amplitude of the laser light oscillated from the diode laser becomes an optimal value. By employing a device of this design, optimization of the modulation amplitude of the laser light can be easily carried out. Further, since a second derivative spectrum which has a good S/N ratio is obtained, it is possible to perform highly sensitive measurements.

Further, by providing a spectrum calculating device for calculating the peak absorption intensity and the wavelength interval between the minimum values on the left and right hand of the peak in the second derivative spectrum, and a pressure adjusting device for adjusting the pressure of the sample gas based on the results calculated by the spectrum calculating device, optimization of the measurement pressure can be carried out easily, and highly sensitive measurements can be performed.

In the present invention's gas spectroscopic analysis method, laser light which has been frequency modulated from a tunable diode laser is oscillated, the laser light is passed through the sample gas, the intensity of the transmitted light is detected, and the second derivative spectrum is obtained using the detected light intensity, the method being characterized in that the optimal value of the modulation amplitude of the laser light is set so that the wavelength interval between the minimum values on the left and right hand of the peak in the second derivative spectrum is 0.0116 nm. By setting the wavelength interval between the minimum values on the left and right hand of the peak in the second derivative spectrum to be 0.0116 nm, the S/N ratio can be maximized irrespective of the type of sample gas.

The wavelength interval between the minimum values on the left and right hand of the peak in the second derivative spectrum can be set to 0.0116 nm by setting the value of the modulation amplitude of the laser light to the same value as the injection current necessary to change the oscillation wavelength of the diode laser by 0.0232 nm only.

Having set the modulation amplitude of the laser light to an optimal value, the optimal value of the pressure of the sample gas is set so that the absorption intensity of the second derivative spectrum is maximized. As a result, a good S/N ratio and absorption intensity can be obtained. Accordingly, the number of times measurements of the sample gas must be repeated in order to optimize the measurement pressure can be reduced as compared to the conventional art, and the optimization of the measurement pressure, which required much time and effort in the conventional art, can be carried out simply and quickly.

Further, the calibration curve for the trace impurities in the sample gas is formed in a state such that the modulation amplitude of the laser light and pressure of the sample gas have each been set to optimal values. As a result, a calibration curve measured under optimal conditions can be obtained, and trace impurities in the gas can be measured with high sensitivity and accuracy.

BEST MODE FOR CARRYING OUT THE INVENTION

The present invention will now be explained in greater detail.

Employing a method for obtaining the second derivative spectrum of the light absorption intensity by passing frequency modulated diode laser light through a reduced-pressure sample gas, the present inventors performed measurements of the various gases cited below, and obtained the respective second derivative spectrums therefor. Moisture was employed for the trace impurity in the sample gases, and the oscillation wavelength of diode laser 11, which served as the light source, was set to the 1380 nm band, where there is light absorption by moisture. The gases measured were nitrogen ($N_2$), chlorine ($Cl_2$), hydrogen bromide (HBr), hydrogen chloride (HCl), and ammonia gas ($NH_3$).

Table 1 below shows the wavelength interval W in the second derivative spectrum which was obtained when the moisture in the $N_2$ gas was measured, as well as the modulation amplitude, absorption intensity, standard deviation of the background noise, and the S/N ratio at this time. The measurement pressure in all cases was 100 Torr. The absorption intensity was at a moisture concentration value of 1020 ppb. The change quantity in the oscillation wavelength and injection current variation required therefor in the diode laser 11 used in the measurements are shown in Table 2.

TABLE 1

| W (nm) | modulation amplitude (mA) | absorption intensity | noise standard deviation | S/N ratio |
|---|---|---|---|---|
| 0.0096 | 3 | 0.74 | 0.020 | 37 |
| 0.0116 | 4 | 0.96 | 0.024 | 40 |
| 0.0197 | 8 | 1.19 | 0.056 | 21 |

TABLE 2

| oscillation wavelength (nm) | injection current (mA) |
|---|---|
| 0.0174 | 3 |
| 0.0232 | 4 |
| 0.0464 | 8 |

From Table 1, it may be understood that the S/N ratio is largest when the wavelength interval W in the second derivative spectrum is 0.0116 nm, and becomes smaller at the other values. It may further be understood from Tables 1 and 2 that the injection current necessary to change the oscillation wavelength from diode laser 11 by 0.0232 nm is 4 mA When the modulation amplitude is 4 mA, i.e., equivalent to the injection current, the wavelength interval W is 0.0116 nm and the S/N ratio is greatest.

It was understood that for all of the sample gases cited above, the S/N ratio was largest when the wavelength interval W between minimum values A,B on the left and right hand of the second derivative spectrum was 0.0116 nm. Further, the present invention was completed with the realization that the value of the modulation amplitude when the wavelength interval W between minimum values A,B was 0.0116 nm was equivalent to the injection current necessary for changing the wavelength of the laser light by 0.0232 nm.

Figure 1:
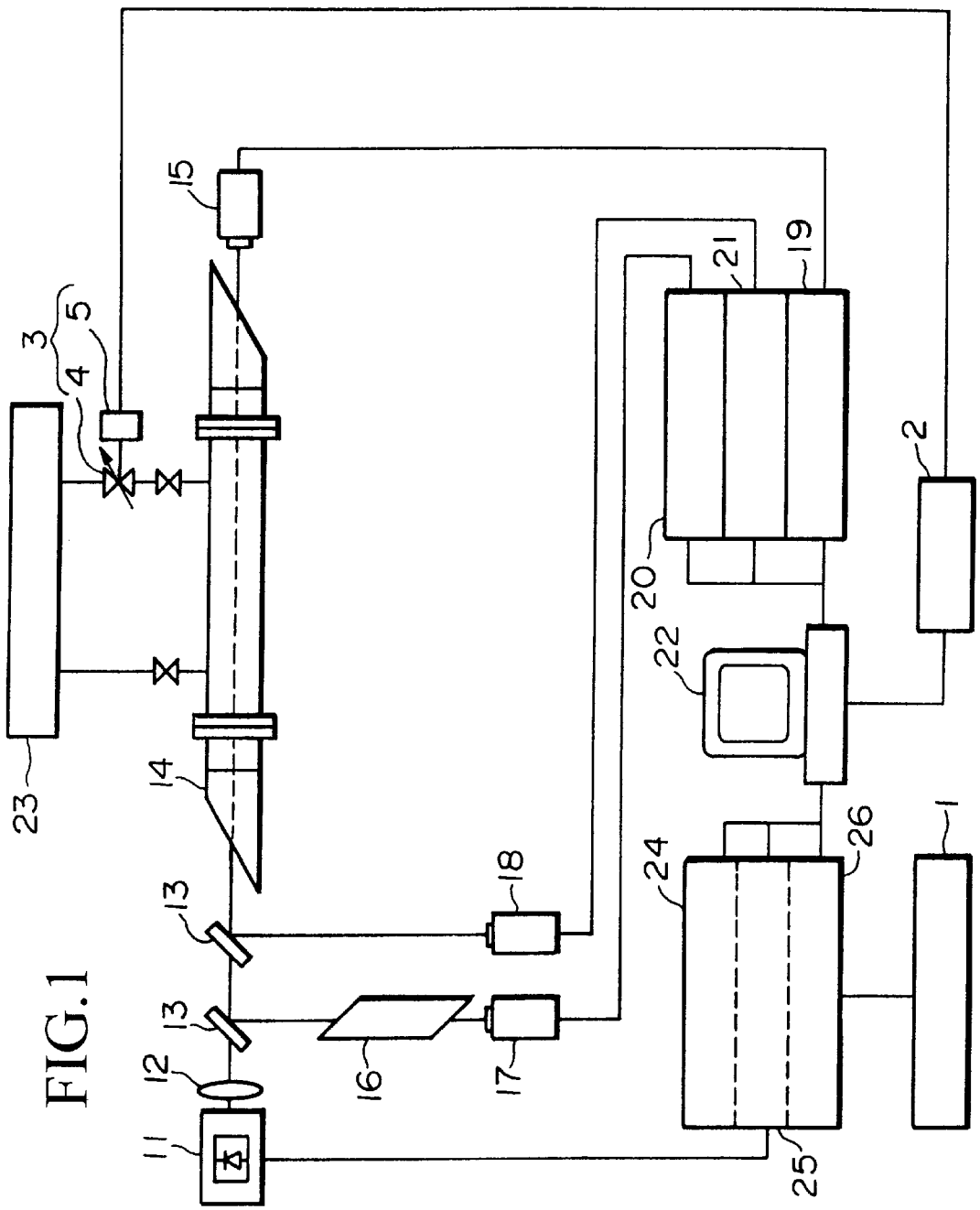
FIG. 1 is a schematic structural view showing an example of the gas spectroscopic analysis device according to the present invention.
Figure 10:
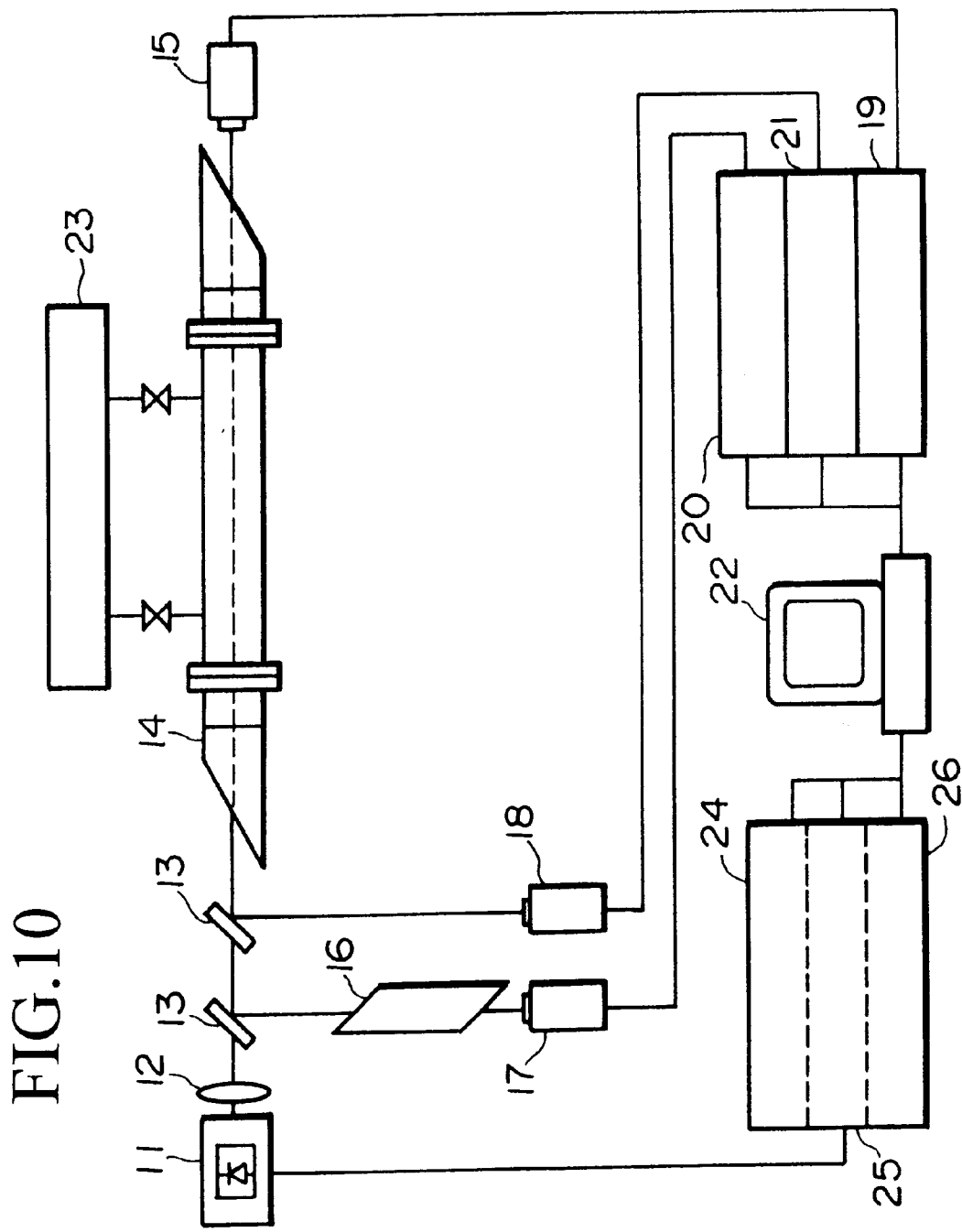
FIG. 10 is a schematic structural view showing an example of a conventional gas spectroscopic analysis device.

FIG. 1 is a schematic structural view showing an example of an embodiment of the present invention's gas spectroscopic analysis device. Structural elements in this figure which are equivalent to those of the conventional device shown in FIG. 10 have been assigned the same numeric symbol and an explanation thereof has been omitted. The major difference between the spectroscopic analysis device of this embodiment and the conventional device discussed above is the provision of a modulation amplitude calculating device 1 for controlling the modulation amplitude of the laser light in response to the characteristics of the diode laser 11; a spectrum calculating device 2 for calculating the peak absorption intensity and the wavelength interval between the minimum values on the left and right hand of the peak in the second derivative spectrum obtained by measurements; and a pressure adjusting device 3 for controlling the pressure inside the measuring gas-cell based on the calculated results obtained by spectrum calculating device 2.

Modulation amplitude calculating device 1 measures the characteristics of diode laser 11, i.e., measures the relationship between the injection current and the oscillation wavelength, and determines the injection current value MA necessary to change the oscillation wavelength by 0.0232 nm from these characteristics. Modulation amplitude calculating device 1 is designed to employ an MA value equivalent to this injection current value MA as the optimal value of the modulation amplitude, and to control function generator 26 so that the modulation amplitude of the laser light oscillated from diode laser 11, i.e., the amplitude of the modulation signal, becomes MA.

Spectrum calculating device 2 is designed to measure the peak absorption intensity and the wavelength interval W between the minimum values on the left and right hand of the peak in the second derivative spectrum obtained by computer 22 during measurements, and to control pressure adjusting device 3 so that the wavelength interval W between the minimum values is approximately 0.0116 nm, and the peak intensity becomes maximal.

Pressure adjusting device 3 is provided with a pressure adjusting valve 4 near the gas exit on measuring gas-cell 14, and with a controlling device 5 for this valve. Pressure adjusting device 3 adjusts the pressure inside measuring gas-cell 14 using this pressure adjusting valve 4 and controlling device 5.

Modulation amplitude calculating device 1 and spectrum calculating device 2 may be housed within computer 22. Further, pressure adjusting device 3 is not limited to the above design, but may have a design as convenient, provided that it enables adjustment of the pressure within the measuring gas-cell 14.

Figure 2:
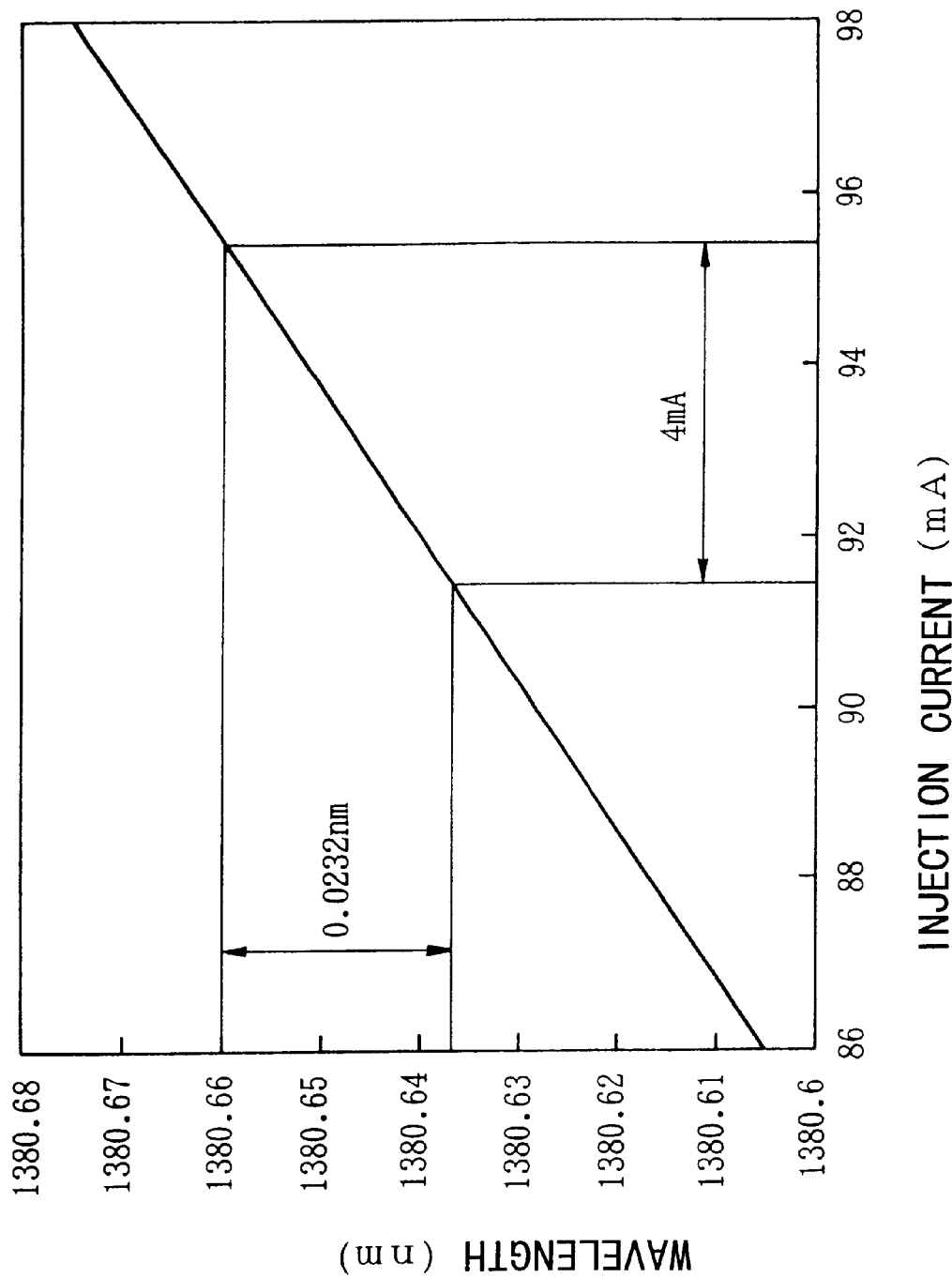
FIG. 2 is a graph of the diode laser characteristics showing the relationship between oscillation wavelength and injection current in a diode laser.
Figure 3:
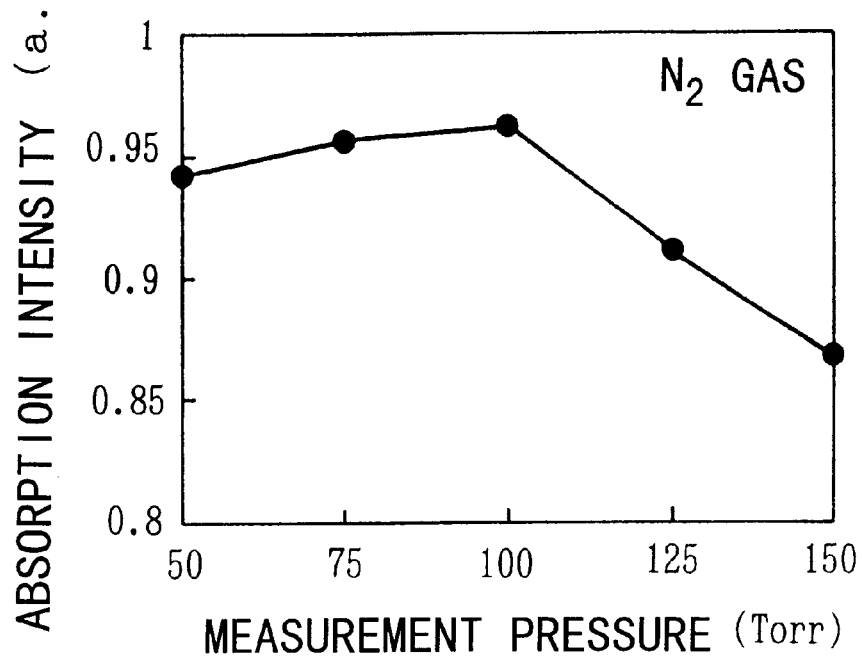
FIG. 3 is a graph showing the relationship between the absorption signal intensity of trace moisture in $N_2$ gas and measurement pressure.
Figure 4:
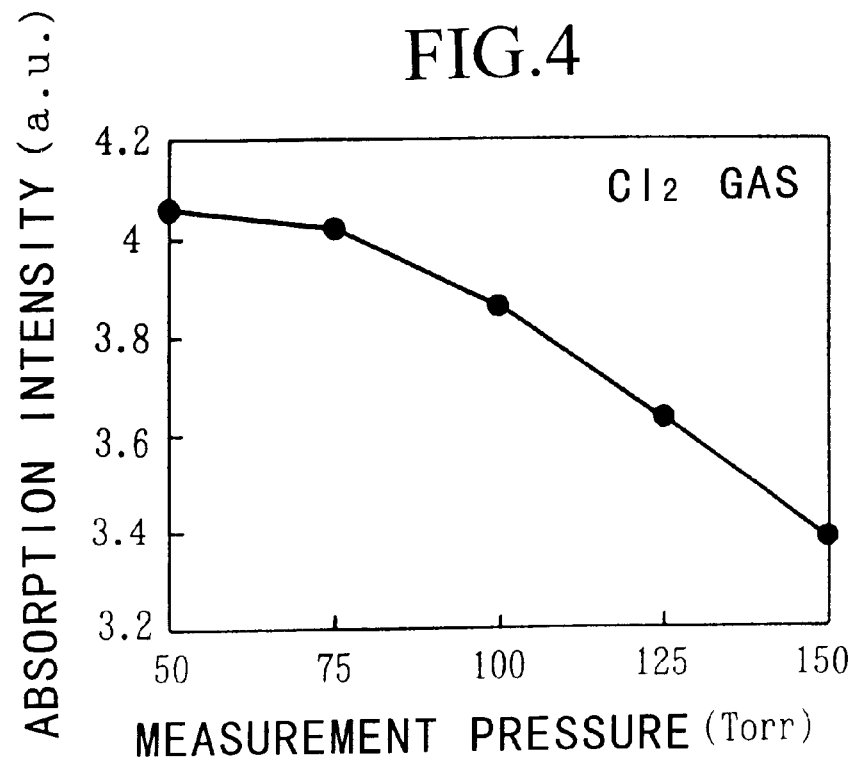
FIG. 4 is a graph showing the relationship between the absorption signal intensity of trace moisture in $Cl_2$ gas and measurement pressure.
Figure 5:
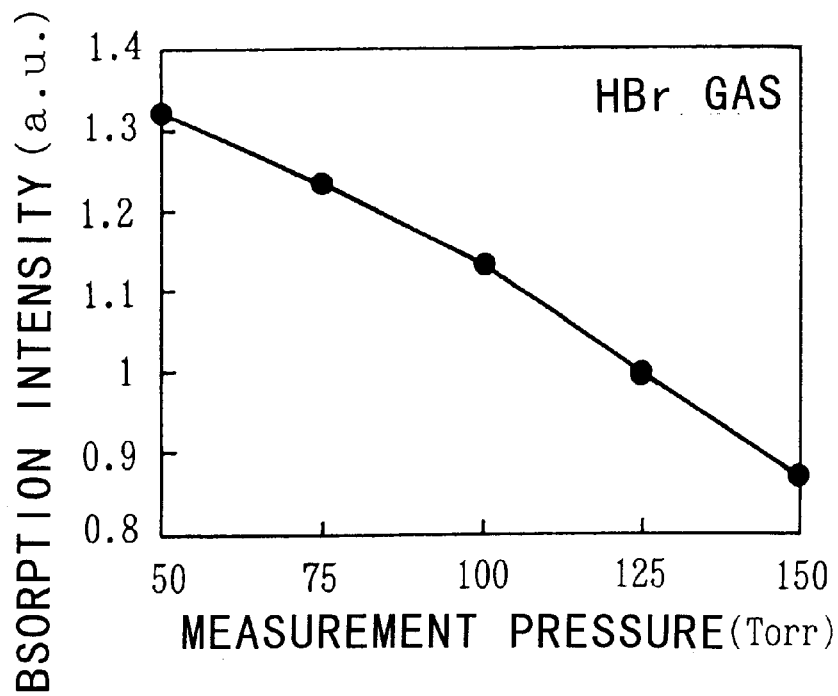
FIG. 5 is a graph showing the relationship between the absorption signal intensity of trace moisture in HBr gas and measurement pressure.
Figure 6:
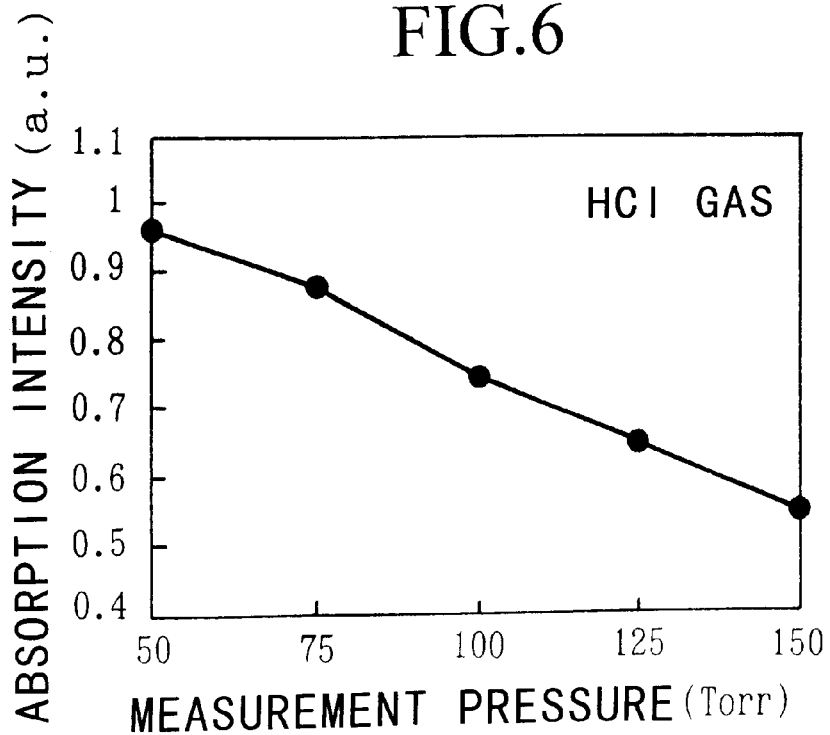
FIG. 6 is a graph showing the relationship between the absorption signal intensity of trace moisture in HCl gas and measurement pressure.

The method for performing gas spectroscopic analysis using this type of device will now be explained. First, measurements are made of the relationship between the oscillation wavelength and the injection current of diode laser 11 which is employed as the light source. In order to determine this relationship, measurements may be made of the wavelength of laser light that is oscillated while continuously changing the direct current component ($I_0$) of the injection current to diode laser 11. The value of the injection current necessary to change the oscillation wavelength by 0.0232 nm is obtained from the determined relationship between the oscillation wavelength and the injection current. This calculation is carried out by modulation amplitude calculating device 1. FIG. 2 is a graph of diode laser characteristics showing an example of the measurement of the relationship between injection current and oscillation wavelength. In this example, it may be understood that the injection current value necessary to change the oscillation wavelength by 0.0232 nm is 4 mA. Thus, since the optimal value of the modulation amplitude of the laser light is 4 mA, function generator 26 is controlled by modulation amplitude calculating device 1 to set the amplitude of the modulation signal to 4 mA.

The thus obtained optimal value for the modulation amplitude depends on the characteristics of the diode laser employed. Even if the gas or impurity which is to be measured changes, this optimal value may still be used if the same diode laser is employed.

Figure 11:
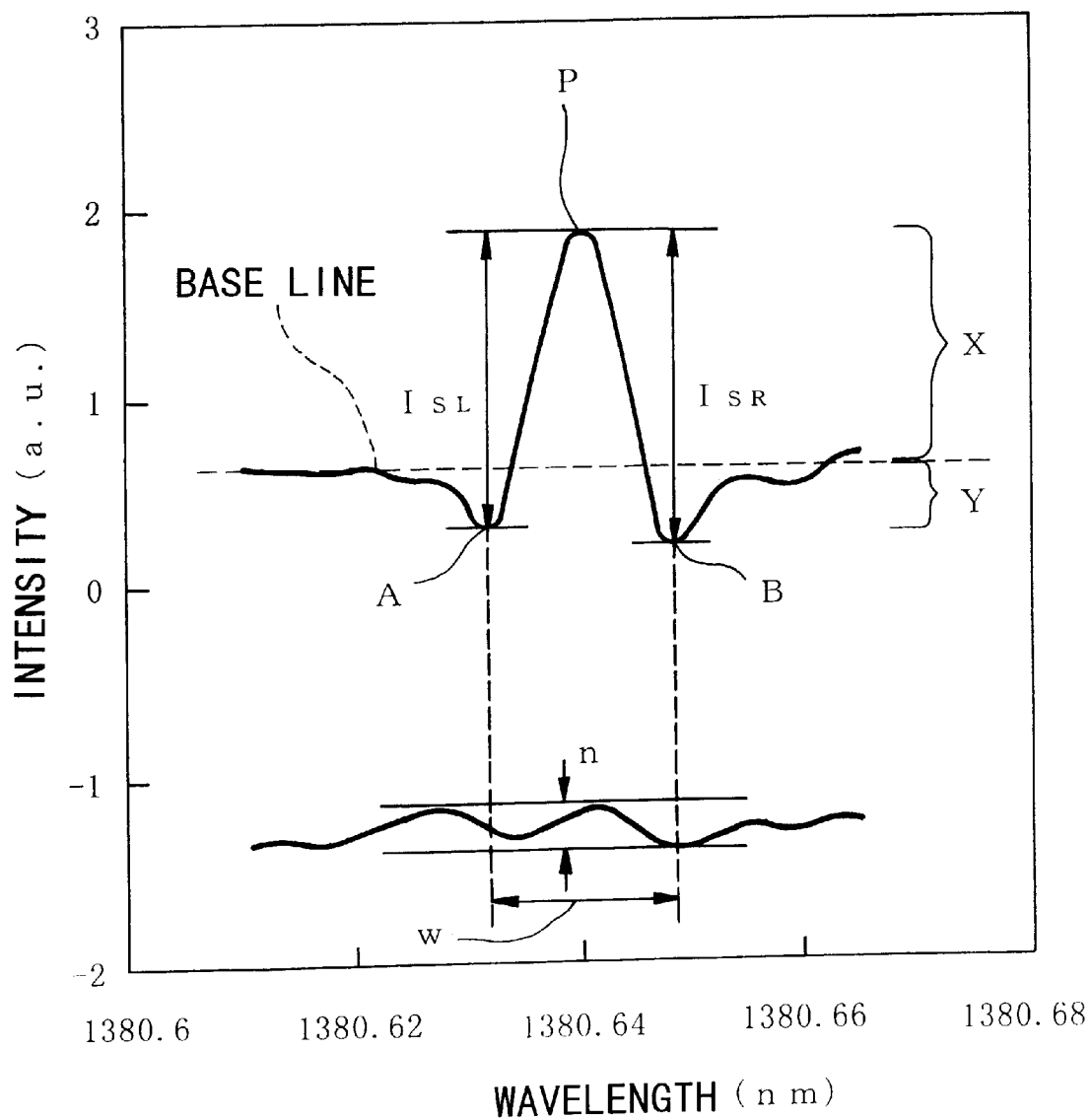
FIG. 11 is an explanatory diagram of the method for obtaining the absorption intensity in the second derivative spectrum.
Figure 12:
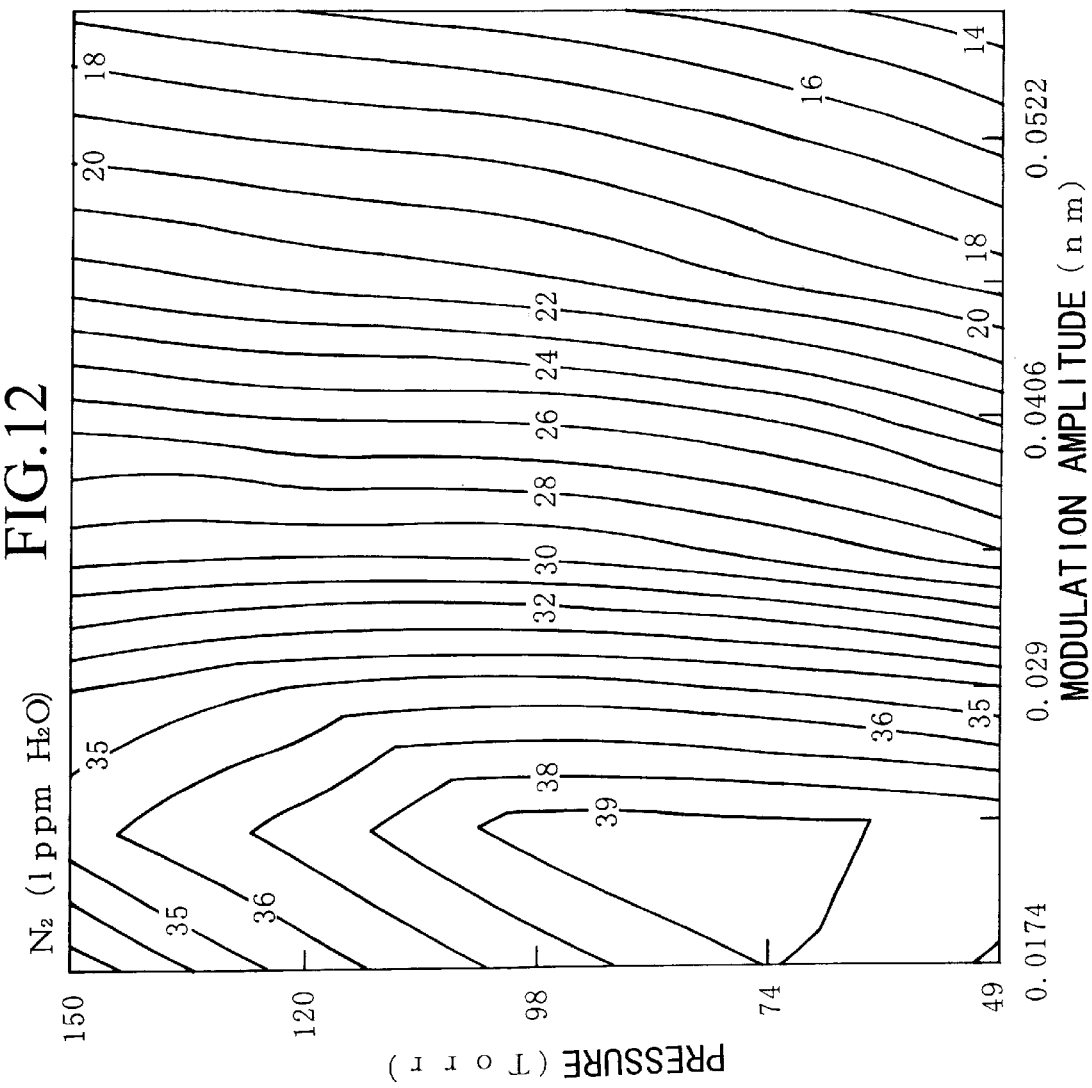
FIG. 12 is a graph showing the results of measurements of the S/N ratio for $N_2$ gas containing a known concentration of moisture.
Figure 13:
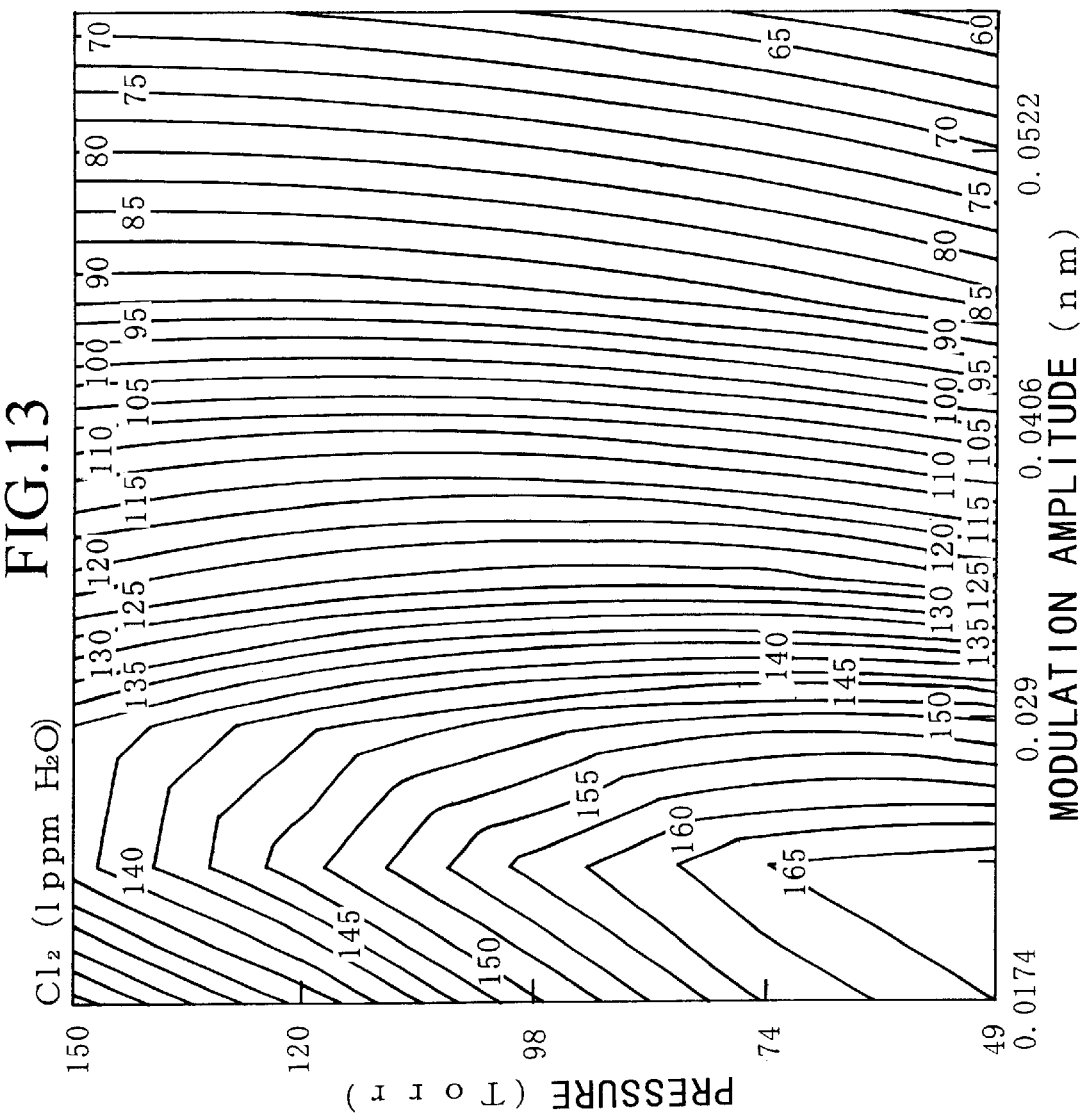
FIG. 13 is a graph showing the results of measurements of the S/N ratio for $Cl_2$ gas containing a known concentration of moisture.
Figure 14:
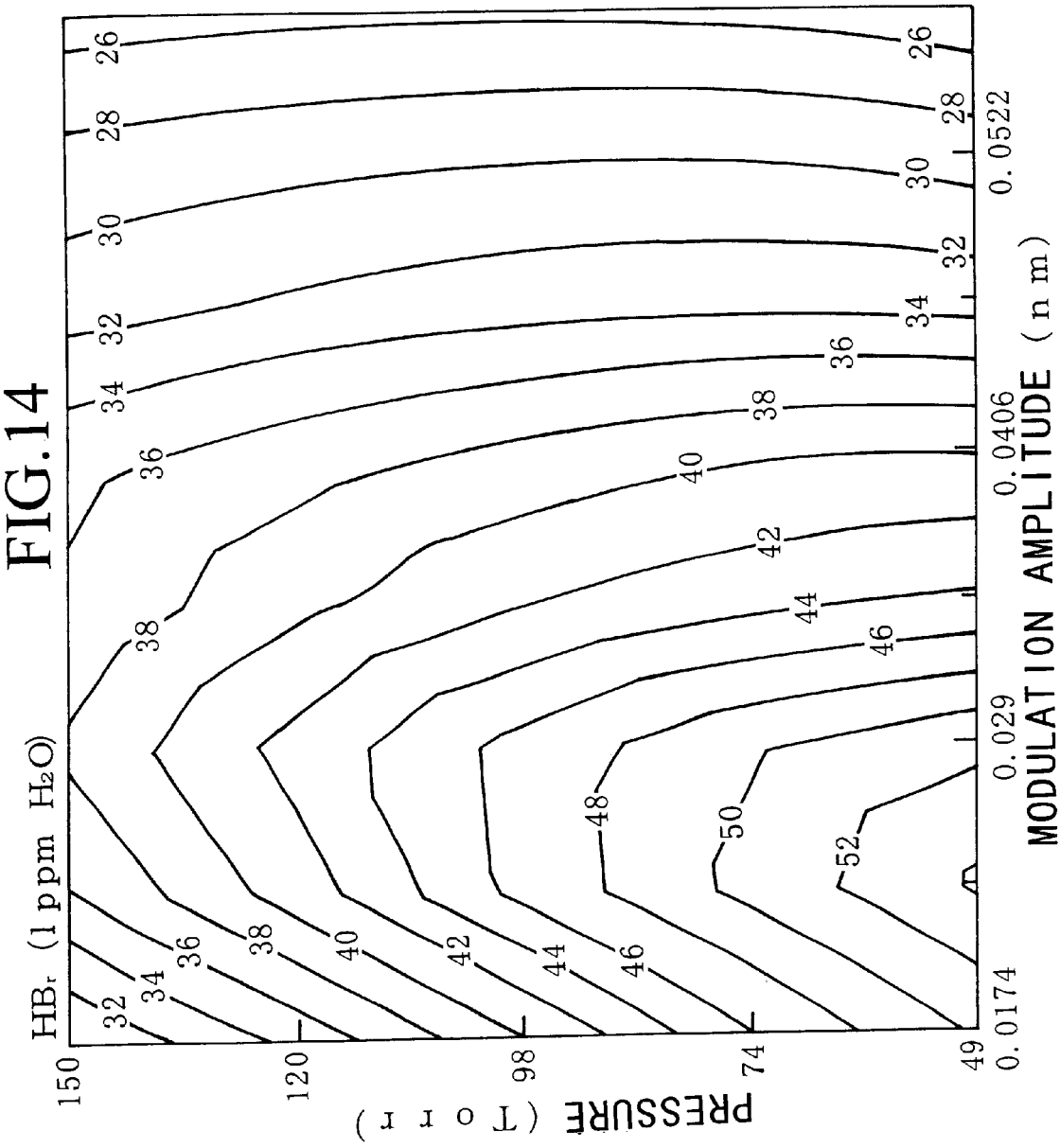
FIG. 14 is a graph showing the results of measurements of the S/N ratio of HBr gas containing a known concentration of moisture.
Figure 15:
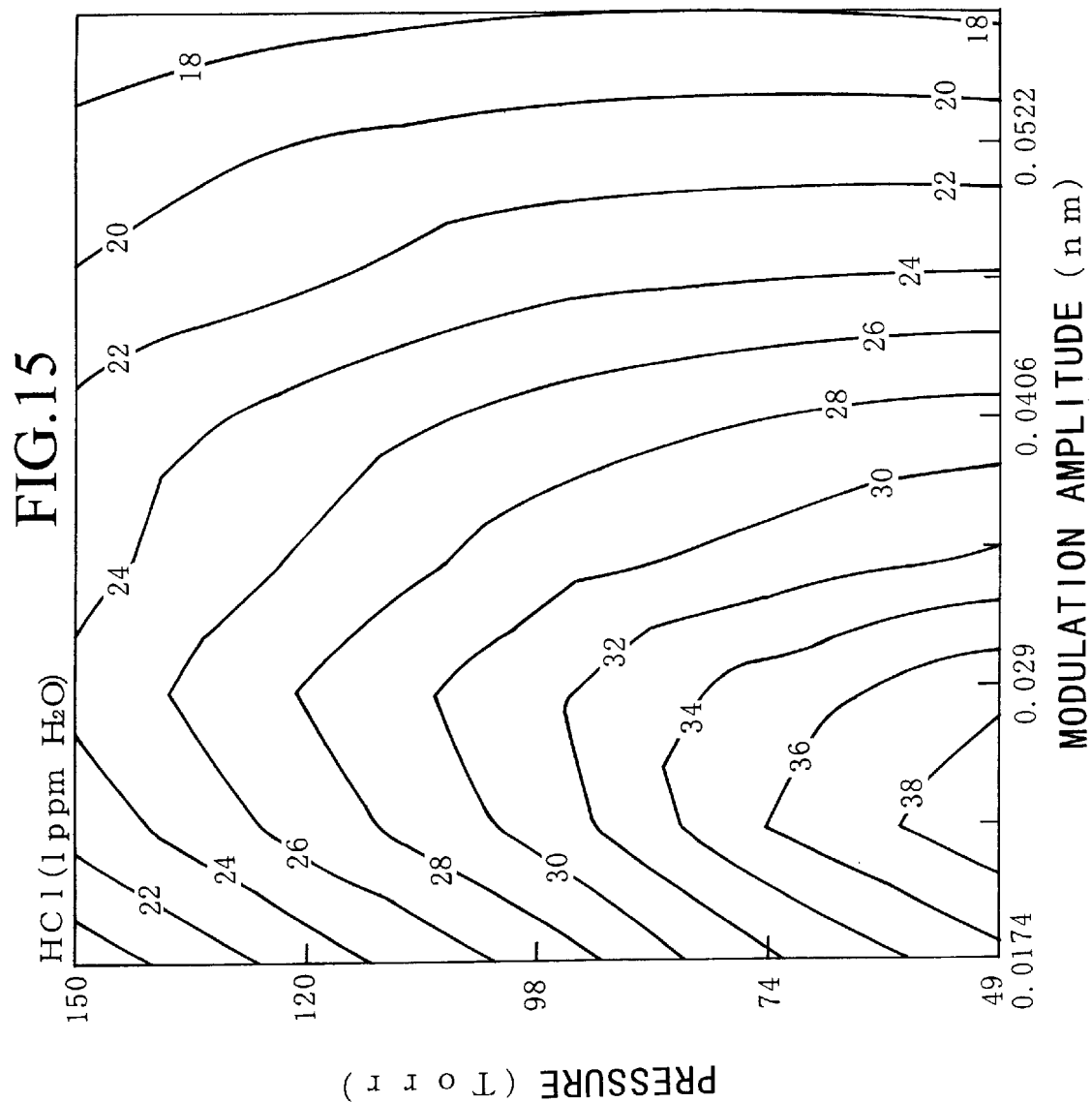
FIG. 15 is a graph showing the results of measurements of the S/N ratio of HCl gas containing a known concentration of moisture.

As shown in FIG. 11, when the area in which there is no absorption is designated as the base line, the frequency (modulation frequency) of the modulation signal is preferably determined so that the ratio of the difference X between the base line and the peak value (intensity) P in the second derivative spectrum, and the difference Y between the base line and the average intensity of minimum values A,B on the left and right hand of the second derivative spectrum, i.e., (X:Y), is approximately 2:1.

Next, the optimal value for measurement pressure is set using the obtained modulation amplitude optimal value. Namely, the modulation amplitude of the laser light is fixed to the optimal value obtained above (4 nA in the example above), measurements of the sample gas are performed while changing the measurement pressure of the sample gas, and the relationship between the absorption intensity of the second derivative spectrum and the measurement pressure are obtained. The optimal value of the measurement pressure, at which absorption intensity is maximal, is obtained. These calculations are carried out by spectrum calculating device 2, while the control of the measurement pressure is performed by pressure adjusting device 3. Because the wavelength interval W between the minimum values in the second derivative spectrum changes slightly when the measurement pressure changes, a calculation of wavelength interval W is also performed in spectrum calculating device 2, and control is carried out so that the value of wavelength interval W does not deviate from approximately 0.0116 nm when the measurement pressure is changed.

FIGS. 3 through 6 are graphs in which the base gases are $N_2$, $Cl_2$, HBr, and HCI, showing the results obtained when the dependence of absorption intensity on pressure was investigated for sample gases in which moisture was included in each of these base gases. The modulation amplitude was 4 mA and the modulation frequency was 4 kHz. The measurement pressure was varied between 50, 75, 100, 125 and 150 (Torr). From these results, it was clear that the optimal value for the measurement pressure was 100 Torr in $N_2$ gas, and was 50 Torr in $Cl_2$, HBr and HCI gases.

Optimization of the measurement pressure in this way needs to be carried out for each sample gas.

Figure 7:
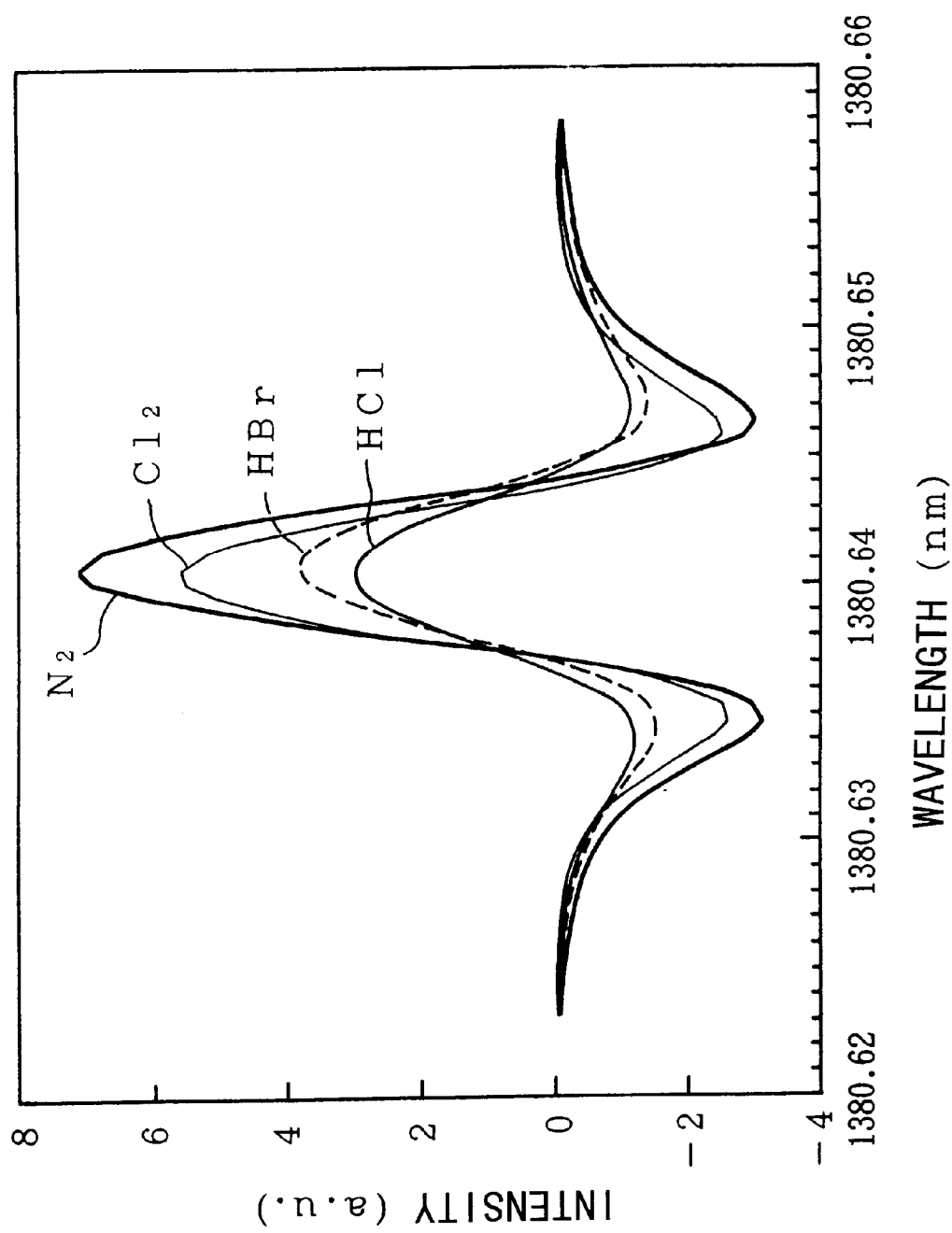
FIG. 7 is a second derivative spectrum showing the results of analysis of the sample gas containing a known concentration of moisture.

FIG. 7 shows the second derivative spectrum when employing the device shown in FIG. 1 to measure $N_2$, $Cl_2$, HBr and HCI gases in which the moisture concentration is 10600 ppb, and both the modulation amplitude and the measurement pressure have been set to optimal values. It may be understood that the wavelength interval W between the left and right hand minimum values in the second derivative spectrum was 0.0116 nm in all cases.

FIGS. 12 through 15 are graphs showing the results obtained when the device shown in FIG. 1 is employed to measure the S/N ratio for each of sample gases $N_2$, $Cl_2$, HBr and HCI having a moisture concentration of 1 ppm by gradually changing the modulation amplitude and the measurement pressure. The modulation frequency here was 4 kHz. The numbers in the graphs are the values of the S/N ratio. The larger the S/N ratio, the better the measurement sensitivity.

From the results of these measurements, it may be understood that an excellent S/N ratio may be obtained when the modulation amplitude and the measurement pressure are within the range shown in Table 3.

TABLE 3

|  | Modulation amplitude (nm) | measurement pressure (Torr) |
|---|---|---|
| nitrogen ($N_2$) | 0.0231~0.0233 | 95~105 |
| chlorine ($Cl_2$) | 0.0230~0.0232 | 50~53 |
| hydrogen bromide (HBr) | 0.02316~0.02324 | 50~52 |
| hydrogen chlorine (HCl) | 0.0232~0.0234 | 50~55 |

Consolidating the results of FIGS. 3 through 7, it may be understood that a maximum S/N ratio, i.e., a large spectrum intensity, can be obtained when the modulation amplitude is 0.0232 nm (injection current: 4 mA) and the measurement pressure is such that the wavelength interval W between the left and right hand minimum values in the second derivative spectrum is 0.0116 nm, irrespective of the type of sample gas.

As may be understood from Table 3, it is not absolutely necessary that the modulation amplitude be 0.0232 nm. Rather, provided that the modulation amplitude is within the range of 0.0230~0.0234 nm, the S/N ratio and the spectrum intensity can be increased by adjusting the measurement pressure conditions.

In order to quantify the trace impurity in a gas, it is necessary to create a calibration curve for the impurity to be measured. For example, the absorption intensity of a sample gas in which a known concentration of an impurity is included in a base gas is measured under optimal conditions while changing the concentration of the impurity, and a graph, i.e., a calibration curve, showing the relationship between the absorption intensity and the impurity concentration is obtained.

When the modulation amplitude and measurement pressure are optimized and calibration curves are formed as described above for each of the sample gases in which the impurity being measured is moisture and the base gases are $N_2$, $Cl_2$, HBr, HCI and $NH_3$, with the other measurement conditions being the same, the ratio of the slope of these calibration curves is $N_2:Cl_2:HBr:HCI:NH_3=$ 1:0.80:0.56:0.42:0.33. Accordingly, if a calibration curve for moisture is made for just one of these bases gases, the calibration curves for the moisture in the other base gases does not actually need to be measured, but rather can be calculated using the aforementioned calibration curve ratio.

Provided that the calibration curves are formed in this way, then, by determining through actual measurement the calibration curve of one sample gas, it becomes possible to use calculations to determine the calibration curves for the other sample gases since the ratio of the slopes of the calibration curves for the different types of sample gases will be constant within the same device. Accordingly, the work and time needed to correct one device can be greatly reduced, and the costs associated with this correction may be decreased.

Figure 8:
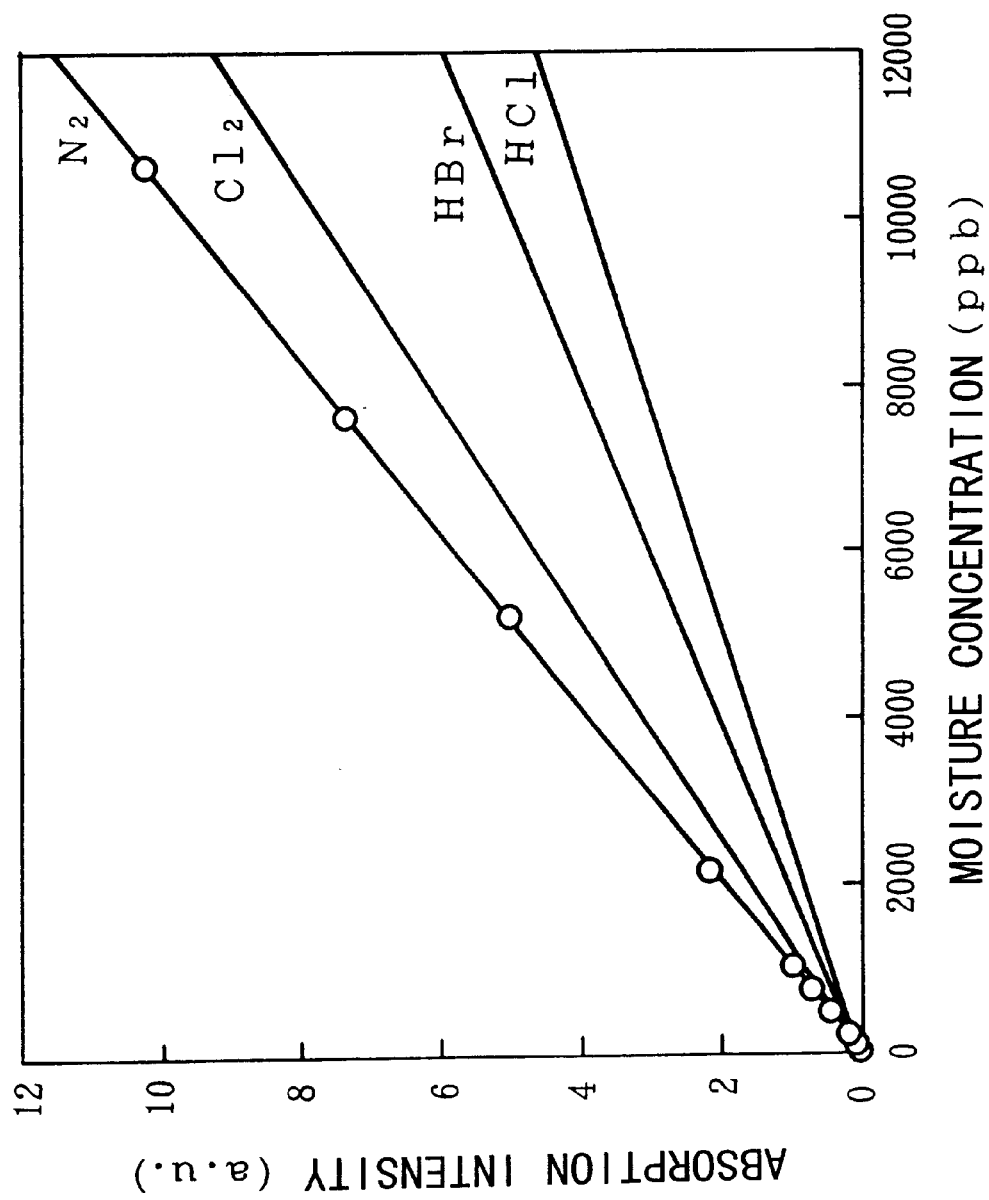
FIG. 8 is a graph showing an example of the calibration curve obtained using the present invention's method.

FIG. 8 shows an example of the calibration curves for moisture in $N_2$, $Cl_2$, HBr and HCI gas. An calibration curve was made by actual measurement for the moisture in $N_2$ gas, while calibration curves for the moisture in the other gases were calculated and formed using the ratio of the slopes of the calibration curves as described above.

When measuring the moisture in $N_2$ gas, a standard gas supplied from a cylinder, in which the base gas is $N_2$ gas and the moisture concentration is 92,400 ppb, is diluted with high purity $N_2$ gas in which the moisture concentration is 1 ppb or less, to formulate a sample gas in which the moisture concentration is in the range of 54~10,630 ppb. Measurements were performed 10 times at the respective moisture concentrations, to determine an absorption intensity. With respect to the measurement conditions, the modulation amplitude and measurement pressure were set to optimal values of 4 mA and 100 Torr respectively, while the modulation frequency was 4 Hz and the optical path length was 50 cm. The injection current (direct current component) of diode laser 11 was varied from 88.8 mA to 95.2 mA, while the oscillation wavelength was varied from 1380.623 nm to 1380.658 nm. Sampling of the measurement data was conducted at each injection current of 0.1 mA and each oscillation wavelength of 0.00058 nm. The sensitivity and the time constants of lock-in amplifiers 19,20,21 were set to 500 $\mu V$ and 300 ms respectively. Only the 8 kHz component, i.e., the twice component of the modulation frequency, was extracted, and the second derivative spectrum was measured. The average value of the absorption intensity obtained in the 10 measurements was designated as the measured result. The measured result is plotted on a graph in which absorption intensity is represented in the vertical axis and moisture concentration represented in the horizontal axis. A calibration curve for moisture in $N_2$ gas such as shown in FIG. 8 was obtained. The equation of this calibration curve was calculated to be $Y=9.61 \times 10^{-4} X + 2.82 \times 10^{-2}$.

Based on thus-obtained equation for the calibration curve for moisture in the $N_2$ gas, the calibration curve slope ratios described above were employed to obtain the following equations for the calibration curves for moisture in $Cl_2$, HBr and HCl gases.

$Cl_2$: $Y=7.68 \times 10^{-4} X + 2.82 \times 10^{-2}$

HBr: $Y=4.87 \times 10^{-4} X + 2.82 \times 10^{-2}$

HCl: $Y=3.81 \times 10^{-4} X + 2.82 \times 10^{-2}$

When these equations are graphed, the calibration curves shown in FIG. 8 are obtained. By employing these calibration curves, the quantification of the moisture in each of the sample gases can be carried out with high sensitivity and accuracy.

Figure 9:
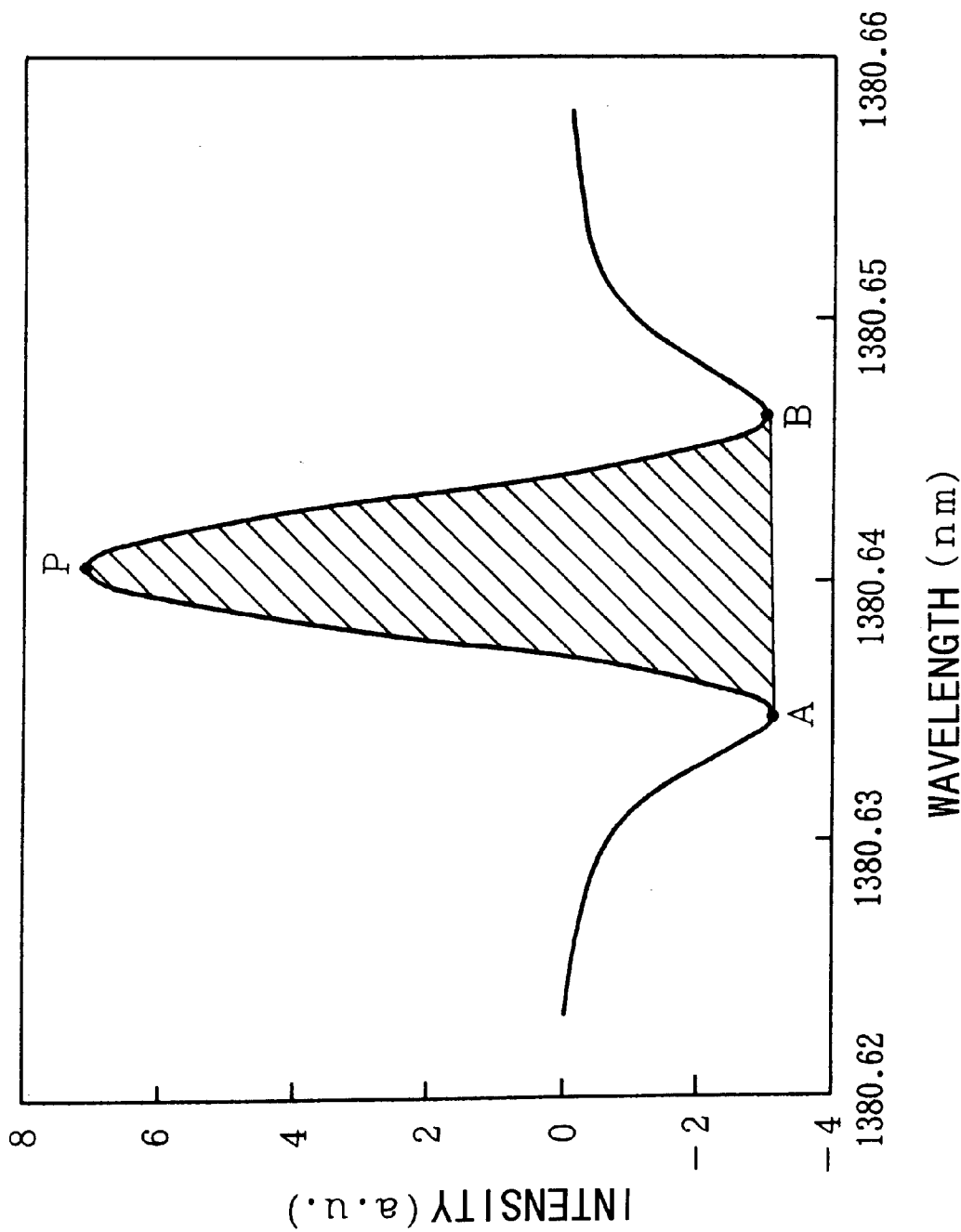
FIG. 9 is an explanatory diagram of the method for obtaining the absorption intensity in the second derivative spectrum.

A method for calculating the absorption intensity may be employed in which the average of the respective intensities from the maximum point (peak P) to the left and right hand minimum points A,B in the second derivative spectrum are calculated as shown in FIG. 11. However, it is also acceptable to employ a method in which the area (indicated by diagonal hatching in the figure) enclosed by maximum point (peak P) and the left and right hand minimum points A,B in the second derivative spectrum is calculated as shown in FIG. 9.

The present embodiment employed $N_2$, $Cl_2$, HBr, HCl, and $NH_3$ as the base gases and moisture as the impurity being measured. However, the present invention is not limited to these types of gases, but may be suitably employed in the spectroscopic analysis of other gases in addition to these.

INDUSTRIAL APPLICABILITY

As described above, the present invention enables the laser light modulation amplitude to be optimized and an excellent S/N ratio to be obtained by setting the value of the modulation amplitude of the laser light to a value which is equal to that of the injection current necessary to change the oscillation wavelength of the diode laser by 0.0232 nm only, and setting the wavelength interval between the minimum values on the left and right hand of the peak in the second derivative spectrum to be 0.0116 nm.

Thus, the optimal value for the modulation amplitude can be obtained through calculation without relying on a method in which actual measurements are made of a sample gas containing impurities. As a result, optimization of the modulation amplitude, which had required much effort and time in the conventional art, can be carried out extremely easily, and highly sensitive measurements can be performed. This optimal value of the modulation amplitude can still be used even if the sample gas and impurity change, provided that the same diode laser is employed. Thus, the present invention is extremely convenient.

What is claimed is:

1. A gas spectroscopic analysis device provided with:

a tunable diode laser;

a frequency modulating device for performing frequency modulation of said diode laser;

a device for passing laser light oscillated by said diode laser through a sample gas;

a device for measuring the intensity of the laser light which has passed through the sample gas;

a device for obtaining the second derivative spectrum from the measured laser light intensity; and a modulation amplitude calculating device for calculating a value of the modulation amplitude from the diode laser characteristics and for controlling the frequency modulating device so that the modulation amplitude of the laser light oscillated from the diode laser becomes said calculated value.

2. A gas spectroscopic analysis device according to claim 1, provided with a spectrum calculating device for calculating the peak absorption intensity and the wavelength interval between the minimum values on the left and right hand of the peak in the second derivative spectrum, and a pressure adjusting device for adjusting the pressure of the sample gas based on the results calculated by said spectrum calculating device.

3. A gas spectroscopic analysis method in which laser light which has been frequency modulated from a tunable diode laser is oscillated, said laser light is passed through the sample gas, the intensity of said transmitted light is detected, and the second derivative spectrum is obtained using the detected light intensity, a value of the modulation amplitude is calculated from the diode laser characteristics by a modulation amplitude calculating device and the frequency modulation is controlled so that the modulation amplitude of the laser light oscillated from the diode laser becomes the calculated value, wherein the calculated value of the modulation amplitude of the laser light is set so that the wavelength interval between the minimum values on opposing sides of a peak in said second derivative spectrum is 0.0116 nm.

4. A gas spectroscopic analysis method in which laser light which has been frequency modulated from a tunable diode laser is oscillated, said laser light is passed through the sample gas, the intensity of said transmitted light is detected, and the second derivative spectrum is obtained using the detected light intensity, a value of the modulation amplitude is calculated from the diode laser characteristics by a modulation amplitude calculating device and the frequency modulation is controlled so that the modulation amplitude of the laser light oscillated from the diode laser becomes the calculated value, wherein the calculated value of the modulation amplitude of the laser light is set to the same value as the injection current necessary to change the oscillation wavelength of the diode laser by 0.0232 nm only.

5. A gas spectroscopic analysis method in which laser light which has been frequency modulated from a tunable diode laser is oscillated, said laser light is passed through the sample gas, the intensity of said transmitted light is detected, and the second derivative spectrum is obtained using the detected light intensity, a value of the modulation amplitude is calculated from the diode laser characteristics by a modulation amplitude calculating device and the frequency modulation is controlled so that the modulation amplitude of the laser light oscillated from the diode laser becomes the calculated value, wherein, having set the modulation amplitude of the laser light to the calculated value, a value of the pressure of the sample gas is set so that the absorption intensity of the second derivative spectrum is maximized.

6. A gas spectroscopic analysis method according to claim 5, wherein, having set the modulation amplitude of the laser light and the pressure of the sample gas to respective values, a calibration curve for the trace impurities in the sample gas is formed.

7. A gas spectroscopic analysis device provided with:

a tunable diode laser;

means for performing frequency modulation of said diode laser;

means for passing laser light oscillated by said diode laser through a sample gas;

means for measuring the intensity of the laser light which has passed through the sample gas;

means for obtaining the second derivative spectrum from the measured laser light intensity; and means for calculating a value of the modulation amplitude from the diode laser characteristics and for controlling the frequency modulating device so that the modulation amplitude of the laser light oscillated from the diode laser becomes said calculated value.

8. A gas spectroscopic analysis device according to claim 7, further comprising:

means for calculating a peak absorption intensity and a wavelength interval between minimum values on a left and right hand side of a peak in the second derivative spectrum; and means for adjusting pressure of the sample gas based on results calculated by said means for calculating a peak absorption intensity.

* * * * *